(12) United States Patent
Ashelin et al.

(10) Patent No.: US 8,353,136 B2
(45) Date of Patent: Jan. 15, 2013

(54) LOW PROFILE SUPPORT PANEL FOR A DOCK SEAL

(75) Inventors: Charles J. Ashelin, Dubuque, IA (US); David J. Hoffmann, Peosta, IA (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 0 days.

(21) Appl. No.: 13/178,257

(22) Filed: Jul. 7, 2011

(65) Prior Publication Data

US 2011/0265400 A1 Nov. 3, 2011

Related U.S. Application Data

(63) Continuation of application No. 11/557,351, filed on Nov. 7, 2006.

(51) Int. Cl.
*E04D 13/18* (2006.01)
(52) U.S. Cl. ...................................... 52/173.2; 52/173.1
(58) Field of Classification Search ................. 52/173.2, 52/173.1
See application file for complete search history.

(56) References Cited

U.S. PATENT DOCUMENTS

| | | |
|---|---|---|
| 615,174 A | 11/1898 | Hettrick |
| 688,595 A | 12/1901 | Coe |
| 1,008,491 A | 11/1911 | Pruden |
| 1,587,134 A | 6/1926 | Anton |
| 2,565,393 A | 8/1951 | Oswald |
| 2,576,692 A | 11/1951 | Smith |
| 2,627,912 A | 2/1953 | Soppeland |
| 2,704,574 A | 3/1955 | Etlar |
| 2,764,236 A | 9/1956 | Dye |
| 2,892,463 A | 6/1959 | Frommelt et al. |
| 2,898,983 A | 8/1959 | Etten |
| 3,095,886 A | 7/1963 | Frommelt et al. |
| 3,181,205 A | 5/1965 | Frommelt et al. |
| 3,195,953 A | 7/1965 | Zacks |
| 3,216,433 A | 11/1965 | D'Azzo |
| 3,230,675 A | 1/1966 | Frommelt et al. |
| 3,299,570 A | 1/1967 | Radcliffe |
| 3,322,132 A | 5/1967 | Rieder et al. |
| 3,352,314 A | 11/1967 | Frommelt et al. |
| 3,375,625 A | 4/1968 | Edkins et al. |
| 3,391,503 A | 7/1968 | O'Neal |
| 3,403,489 A | 10/1968 | Frommelt et al. |

(Continued)

FOREIGN PATENT DOCUMENTS

CH 600117 6/1978

(Continued)

OTHER PUBLICATIONS

State Intellectual Property Office of China, "First Office Action," issued in connection with Chinese application serial No. 2007800412211, issued Jul. 6, 2011, 6 pages.

(Continued)

*Primary Examiner* — Basil Katcheves
(74) *Attorney, Agent, or Firm* — Hanley, Flight & Zimmerman, LLC

(57) ABSTRACT

Dock seal for use with loading docks are described. An example dock seal includes a compressible body having a front compressible body and a rear compressible body, where the rear compressible body is interposed between the wall and the front compressible body when the dock seal is mounted to the wall. A flexible panel pivotally couples the compressible body to the wall.

30 Claims, 10 Drawing Sheets

U.S. PATENT DOCUMENTS

| | | | |
|---|---|---|---|
| 3,415,026 | A * | 12/1968 | Tillisch et al. ............... 52/262 |
| 3,493,984 | A | 2/1970 | Reinhard |
| 3,500,599 | A | 3/1970 | Sciolino |
| 3,528,086 | A | 9/1970 | Conger |
| 3,538,655 | A | 11/1970 | Frommelt et al. |
| 3,557,508 | A | 1/1971 | Frommelt et al. |
| 3,613,324 | A | 10/1971 | Conger |
| 3,638,667 | A | 2/1972 | Frommelt et al. |
| 3,644,952 | A | 2/1972 | Hatch |
| 3,653,155 | A | 4/1972 | de Brunyn, Jr. et al. |
| 3,653,173 | A | 4/1972 | Frommelt et al. |
| 3,665,997 | A | 5/1972 | Smith et al. |
| 3,683,572 | A | 8/1972 | Alten |
| 3,699,733 | A | 10/1972 | Frommelt et al. |
| 3,714,745 | A | 2/1973 | O'Neal |
| 3,772,839 | A | 11/1973 | Timbers |
| 3,792,559 | A | 2/1974 | Frommelt et al. |
| 3,826,049 | A | 7/1974 | Frommelt et al. |
| 3,834,400 | A | 9/1974 | Sattler |
| 3,854,257 | A | 12/1974 | Lobel |
| RE28,391 | E | 4/1975 | Frommelt et al. |
| 3,875,954 | A | 4/1975 | Frommelt et al. |
| 3,915,183 | A | 10/1975 | Frommelt |
| 3,934,380 | A | 1/1976 | Frommelt et al. |
| 3,935,684 | A | 2/1976 | Frommelt et al. |
| 3,939,614 | A | 2/1976 | Frommelt et al. |
| 3,994,103 | A | 11/1976 | Ouellet |
| 4,015,380 | A | 4/1977 | Chalfant |
| 4,038,792 | A | 8/1977 | McGuire et al. |
| 4,062,157 | A | 12/1977 | Potthoff |
| 4,070,801 | A | 1/1978 | O'Neal |
| 4,112,958 | A | 9/1978 | Anderberg |
| 4,213,279 | A | 7/1980 | Layne |
| 4,262,458 | A | 4/1981 | O'Neal |
| 4,381,631 | A | 5/1983 | Frommelt |
| 4,389,821 | A | 6/1983 | O'Neal |
| 4,494,341 | A | 1/1985 | Schwab |
| 4,495,737 | A | 1/1985 | Alten |
| 4,554,768 | A | 11/1985 | Srajer |
| 4,571,903 | A | 2/1986 | Strassner |
| 4,574,542 | A | 3/1986 | Kleynjans |
| 4,601,142 | A | 7/1986 | Frommelt |
| 4,636,423 | A | 1/1987 | Reid |
| 4,638,612 | A | 1/1987 | Bennett |
| 4,679,364 | A | 7/1987 | Fettig et al. |
| 4,682,382 | A | 7/1987 | Bennett |
| 4,686,806 | A | 8/1987 | Bennett |
| 4,711,059 | A | 12/1987 | Layne |
| 4,712,339 | A | 12/1987 | Wenham et al. |
| 4,718,207 | A | 1/1988 | Frommelt et al. |
| 4,724,648 | A | 2/1988 | Diepholder |
| 4,750,299 | A | 6/1988 | Frommelt et al. |
| 4,785,594 | A | 11/1988 | Alten |
| 4,799,341 | A | 1/1989 | Frommelt et al. |
| 4,799,342 | A | 1/1989 | Klevnjans |
| 4,800,618 | A | 1/1989 | Putz |
| 4,800,619 | A | 1/1989 | Hudak |
| 4,805,362 | A | 2/1989 | Frommelt et al. |
| 4,815,490 | A | 3/1989 | Soderstrom |
| 4,821,468 | A | 4/1989 | Moore |
| 4,825,606 | A | 5/1989 | Alten |
| 4,825,607 | A | 5/1989 | Frommelt et al. |
| 4,855,567 | A | 8/1989 | Mueller |
| 4,873,800 | A | 10/1989 | Frommelt et al. |
| 4,873,801 | A | 10/1989 | Winters |
| 4,877,288 | A | 10/1989 | Lee |
| 4,916,870 | A | 4/1990 | Moore |
| 4,922,658 | A | 5/1990 | Coddens |
| 5,007,211 | A | 4/1991 | Ouellet |
| 5,016,391 | A | 5/1991 | Miller et al. |
| 5,055,335 | A | 10/1991 | Wicks |
| 5,125,196 | A | 6/1992 | Moody |
| 5,174,075 | A | 12/1992 | Alten |
| 5,185,977 | A | 2/1993 | Brockman et al. |
| 5,195,285 | A | 3/1993 | Alten |
| 5,282,342 | A | 2/1994 | Brockman et al. |
| 5,473,846 | A | 12/1995 | Giuliani et al. |
| 5,501,508 | A | 3/1996 | Llewellyn |
| 5,538,323 | A | 7/1996 | Henkel |
| 5,553,424 | A | 9/1996 | Brockman et al. |
| 5,608,996 | A | 3/1997 | Brockman et al. |
| 5,622,016 | A | 4/1997 | Frommelt et al. |
| 5,644,812 | A | 7/1997 | Neufeldt et al. |
| 5,651,155 | A | 7/1997 | Hodges et al. |
| 5,658,633 | A | 8/1997 | Di Biase |
| 5,669,665 | A | 9/1997 | Nowak |
| 5,675,945 | A | 10/1997 | Giuliani et al. |
| 5,775,044 | A | 7/1998 | Styba et al. |
| 5,794,678 | A | 8/1998 | Beringer et al. |
| 5,881,414 | A | 3/1999 | Alexander |
| 5,927,025 | A | 7/1999 | Brockman et al. |
| 5,953,868 | A | 9/1999 | Giuliani et al. |
| 5,996,291 | A | 12/1999 | Styba et al. |
| 6,123,136 | A | 9/2000 | Williams |
| 6,170,205 | B1 | 1/2001 | Styba |
| 6,205,721 | B1 * | 3/2001 | Ashelin et al. ............... 52/173.2 |
| 6,233,885 | B1 | 5/2001 | Hoffmann et al. |
| 6,279,641 | B1 | 8/2001 | Malott |
| 6,374,554 | B1 | 4/2002 | Eungard |
| 6,425,214 | B1 | 7/2002 | Boffeli et al. |
| 6,550,191 | B2 | 4/2003 | Hoffmann et al. |
| 7,185,463 | B2 | 3/2007 | Borgerding |
| 7,383,644 | B2 | 6/2008 | Lyu et al. |
| 2001/0018813 | A1 | 9/2001 | Ashelin et al. |
| 2003/0140579 | A1 | 7/2003 | Hoffmann et al. |
| 2004/0075223 | A1 | 4/2004 | Eungard |
| 2005/0010890 | A1 | 1/2005 | Nehmadi et al. |
| 2005/0102929 | A1 | 5/2005 | Hoffmann et al. |
| 2005/0108961 | A1 * | 5/2005 | Chalfant ............... 52/173.2 |
| 2008/0104902 | A1 | 5/2008 | Ashelin et al. |

FOREIGN PATENT DOCUMENTS

| | | |
|---|---|---|
| DE | 2239483 | 2/1974 |
| DE | 2436518 | 8/1975 |
| DE | 3130657 | 2/1983 |
| DE | 4128168 | 3/1993 |
| DE | 4317054 | 11/1994 |
| DE | 29600207 | 2/1996 |
| DE | 29804117 | 5/1998 |
| EP | 0186093 | 7/1986 |
| EP | 0205648 | 12/1986 |
| EP | 0379634 | 8/1990 |
| EP | 0493713 | 7/1992 |
| EP | 0602501 | 6/1994 |
| EP | 0641731 | 3/1995 |
| FR | 2686913 | 8/1993 |
| GB | 0004194 | 0/1907 |
| GB | 1509935 | 5/1978 |
| GB | 2312915 | 11/1997 |
| WO | 9943583 | 9/1999 |
| WO | 02070382 | 9/2002 |

OTHER PUBLICATIONS

Rite-Hite Holding Corporation, "Rain Diverter Curtain," Blueprint No. D802-0176, Model No. Wg402, Jul. 1, 1992, 1 page.

Frommelt Industries, Inc., "VHL Vertically-Movable Bottom Pad Detail," Blueprint Nos. 692-0125 and 692-0126, Oct. 7, 1988, 2 pages.

Frommelt Industries, Inc., "VHL Vertically-Moving Bottom Pad," Drawing No. 692-0029, Oct. 17, 1985, 1 page.

Rite-Hite Holding Corporation, "Split-Cornered C-Curtain," Drawing No. A 204-0029, May 27, 1994, 1 page.

Kinnear, Loading Dock Seal, Brochure, 1978, 4 pages.

Kinnear, "Dock Seal," Installation Instructions, 1978, 5 pages.

Super Seal Mtg. Ltd., "Super Seal Dock Seals," Catalog 11160/SU, Aug. 29, 1989, 8 pages.

Canadian Intellectual Property Office, "Office Action," issued in connection with Canadian application serial No. 2,669,048, issued May 20, 2011, 3 pages.

Canadian Intellectual Property Office, "Office Action," issued in connection with Canadian application serial No. 2,669,048, issued May 17, 2010, 3 pages.

European Patent Office, "Office Communication," issued in connection with application serial No. 07 853 733.9, issued Aug. 4, 2010, 5 pages.

International Bureau, "International Preliminary Report on Patentability," issued in connection with international application serial No. PCT/US2007/080210, issued May 12, 2009, 9 pages.

International Searching Authority, "International Search Report," issued in connection with international application serial No. PCT/US2007/080210, issued Jan. 14, 2009, 9 pages.

International Searching Authority, "Written Opinion of the International Searching Authority," issued in connection with international application serial No. PCT/US2007/080210, issued Jan. 14, 2009, 9 pages.

International Searching Authority, "Partial Search Report," issued in connection with international application serial No. PCT/US2007/080210, issued Feb. 28, 2008, 3 pages.

United States Patent and Trademark Office, "Final Office Action," issued in connection with U.S. Appl. No. 11/557,351, issued Jan. 28, 2011, 23 pages.

United States Patent and Trademark Office, "Non-Final Office Action," issued in connection with U.S. Appl. No. 11/557,351, issued Jun. 8, 2010, 16 pages.

United States Patent and Trademark Office, "Restriction Requirement," issued in connection with U.S. Appl. No. 11/557,351, issued Jan. 15, 2010, 8 pages.

Mexican Patent Office, "Examination Report," issued in connection with Mexican application serial No. MX/a/2009/004836, issued Feb. 22, 2012, 2 pages.

Intellectual Property Office of P.R. China, "Second Office Action," with English translation, issued in connection with Chinese application serial No. 200780041221.1, issued May 16, 2012, 6 pages.

European Patent Office, "Decision to Grant," issued in connection with European application serial No. 07853733.9, mailed Jun. 1, 2012, 1 page.

Canadian Intellectual Property Office, "Office Action," issued in connection with application serial No. 2,669,048, issued Apr. 16, 2012, 3 pages.

European Patent Office, "Extended European Search Report," issued in connection with application serial No. 12004779.0, issued Sep. 5, 2012, 5 pages.

* cited by examiner

LOW PROFILE SUPPORT PANEL FOR A DOCK SEAL

CROSS REFERENCE TO RELATED APPLICATION

This patent arises as a continuation of U.S. patent application Ser. No. 11/557,351, filed Nov. 7, 2006, entitled "Low Profile Support Panel for a Dock Seal," which is incorporated herein by reference in its entirety.

FIELD OF THE DISCLOSURE

The subject disclosure generally pertains to loading dock seals and more specifically to a unique support panel for such a seal.

BACKGROUND OF RELATED ART

When an exterior doorway of a building is used as a loading dock for vehicles, such as trucks and tractor/trailers, the perimeter of the doorway often includes a dock seal. Dock seals close off gaps that would otherwise exist between the exterior face of the building and the back end of the trailer. Dock seals allow cargo from the rear of the trailer to be loaded or unloaded while dockworkers and the cargo are protected from the weather. Usually two side seals run vertically along the lateral edges of the doorway, and a top or head seal runs horizontally along the doorway's upper edge; however, additional seals can also be used.

A typical dock seal comprises a resiliently compressible foam core supported by a rigid backer, such as a wood plank or a formed metal plate. The foam core and backer are normally encased within a fabric outer cover. Sealing is provided by backing the trailer up against the seal so that the seal compressively conforms to the rear shape of the trailer. The foam core provides the necessary compliance and resilience to repeatedly conform to the shape of various trailers; the outer cover protects the foam core from dirt, water and wear; and the backer provides solid structure for mounting the seal to the wall and for supporting the foam core so that the foam core does not twist and roll within the fabric cover.

Due to the trailer's wheel suspension, adding or removing cargo and/or driving a forklift on and off the trailer bed can cause the rear of the trailer to repeatedly rise and lower a few inches. Although the incidental movement can be a problem, most dock seals are sufficiently wear resistant to tolerate such movement.

A more serious problem, however, can occur after a tractor backs its trailer up against the dock seal, and the trailer is subsequently unhitched from the tractor while the trailer is still up against the seal. The front end of the unhitched trailer might then be set back down on the trailer's landing gear or temporarily rehitched onto a special tractor (yard jockey or yard mule) designated specifically for shuffling trailers around the loading dock area. Hitching and unhitching the front end of the trailer can cause the entire trailer to tilt about its rear wheels. The resulting seesaw action produces substantial up and down movement at the rear end of the trailer, which can cut and abrade the dock seal.

Moreover, when the front end of the trailer is raised, which tilts the rear end of the trailer downward, the upper rear edge of the trailer can dig deeply into the dock's head seal. When the front end of the trailer is subsequently lowered, the trailer's rear edge can pry the head seal upward.

In some cases, the trailer's rear edge digs into the seal so deeply that the edge catches the seal's backer and pries the head seal off the wall. This particularly tends to happen with relatively thick backers that are made intentionally thick to provide the foam core with ample support. If the backer is too thin, however, or omitted entirely in order to prevent the trailer's rear edge from catching the backer, the foam core may tend to roll and twist within the outer fabric cover. Thus, it can be difficult to design a backer with a thickness that addresses both problems.

DETAILED DESCRIPTION

Figure 1:
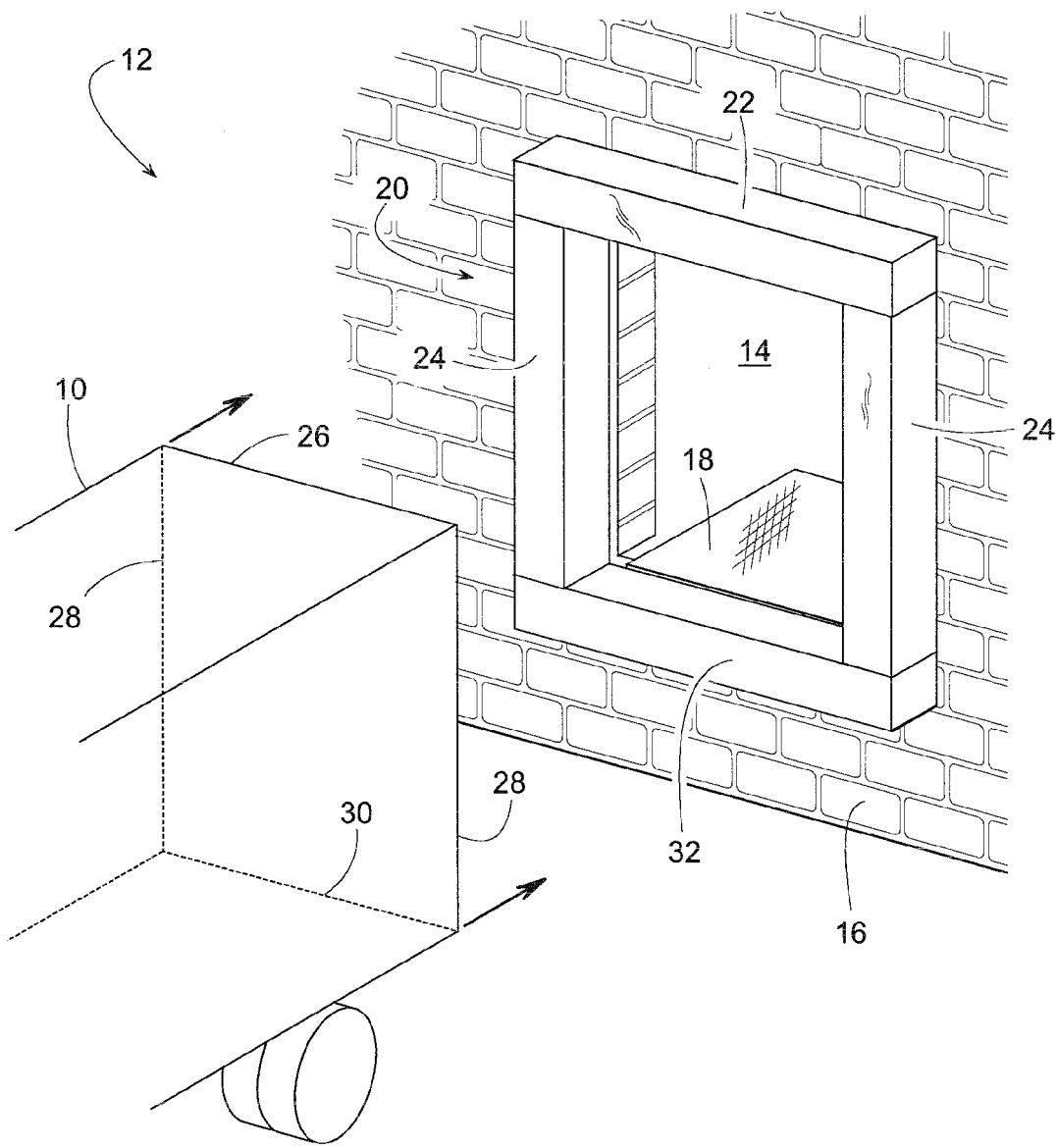
FIG. 1 is a perspective view of a vehicle backing to a loading dock that includes a novel dock seal.
Figure 3:
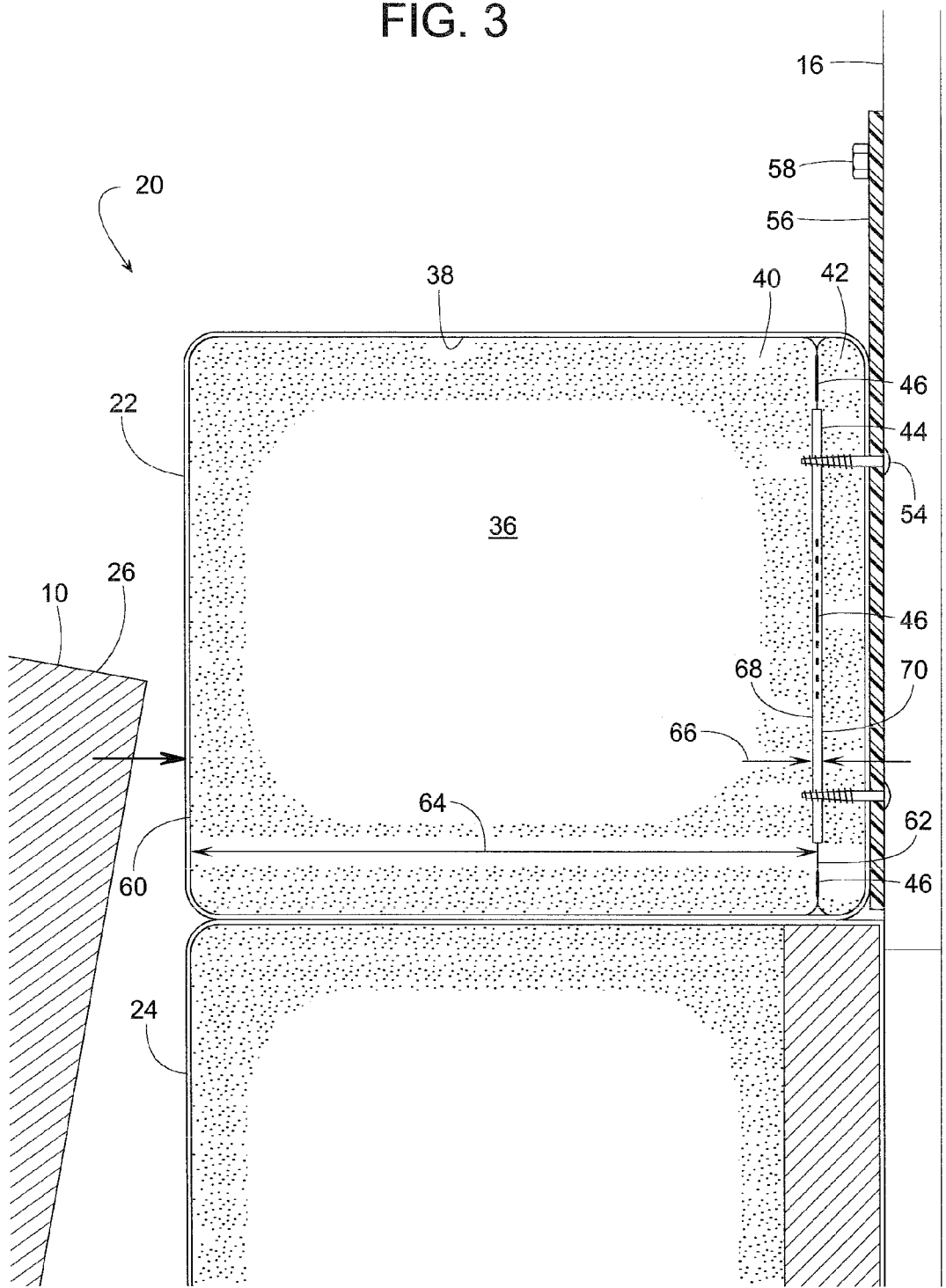
FIG. 3 is a cross-sectional end view of a head seal and a lateral seal with a vehicle approaching the seals.

FIGS. 1 and 3 show a vehicle 10, such as a trailer of a truck, backing up to a loading dock 12. Loading dock 12 is basically a doorway 14 or an opening in a wall 16 of a building and may be associated with a dock leveler 18, bumpers, and other items that facilitate loading and unloading of the vehicle's cargo. One such item in particular, which is the subject of this disclosure, is a compressible dock seal 20. Dock seal 20 may comprise a head seal 22 and/or two lateral seals 24, which are shown in a relaxed position in FIGS. 1 and 3.

Figure 2:
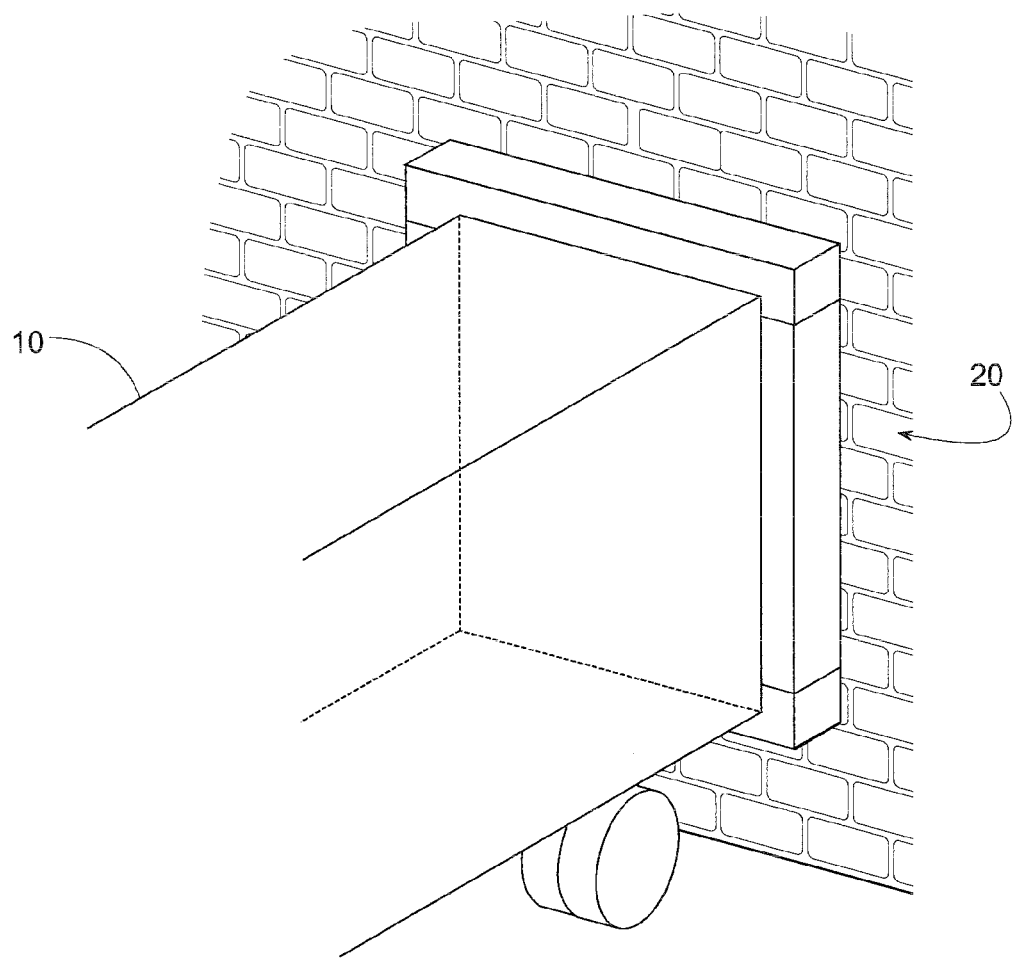
FIG. 2 is a perspective view similar to FIG. 1 but showing the vehicle backed up against the dock seal.
Figure 4:
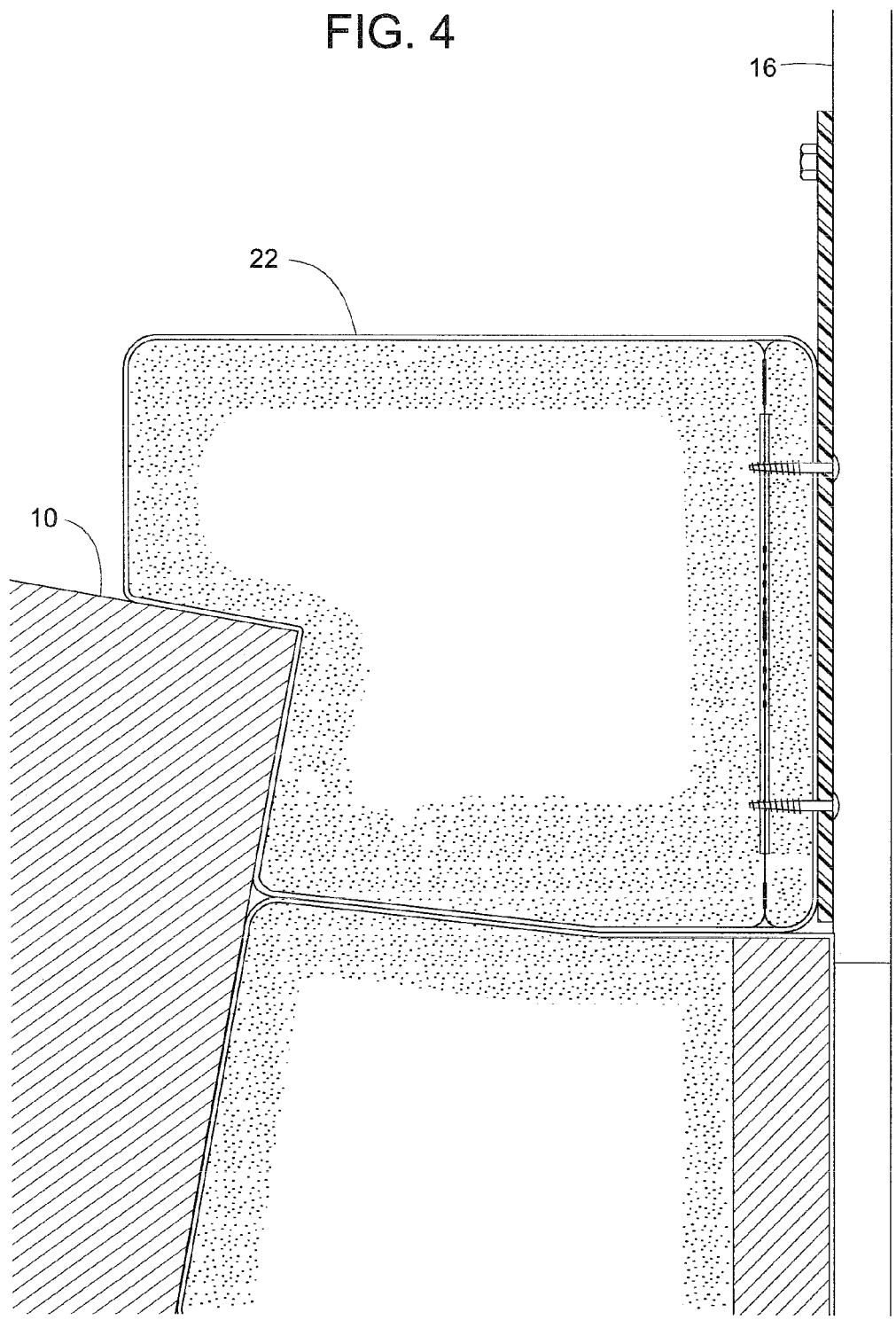
FIG. 4 is a cross-sectional end view similar to FIG. 3 but showing the upper rear edge of the vehicle pressing into the dock seal.

When vehicle 10 is backed up against dock seal 20, as shown in FIGS. 2 and 4, head seal 22 and lateral seals 24 can help close the air gap that might otherwise exist between the outer face of wall 16 and an upper edge 26 and lateral edges 28 of the rear of vehicle 10. Although much of the gap near a lower rear edge 30 of vehicle 10 is usually blocked off by an extendable lip of dock leveler 18, it is conceivable for dock seal 20 to also include a lower seal 32 for more complete sealing.

It is not unusual for vehicle 10 to press its rear edges 26 and 28 tightly against dock seal 20. If these edges subsequently move up and down due to vehicle 10 being loaded and unloaded of cargo, or the vehicle's trailer tilts due to the front end of the trailer being hitched or unhitched, then the trailers' rear edges 26 and 28 might dig deeply into seal 20. In some cases, the vehicle's upper rear edge 26 might pry head seal 22 upward from its position of FIG. 4 to a pried-up position of FIG. 5. This is a common occurrence when using a yard jockey at a loading dock.

Figure 5:
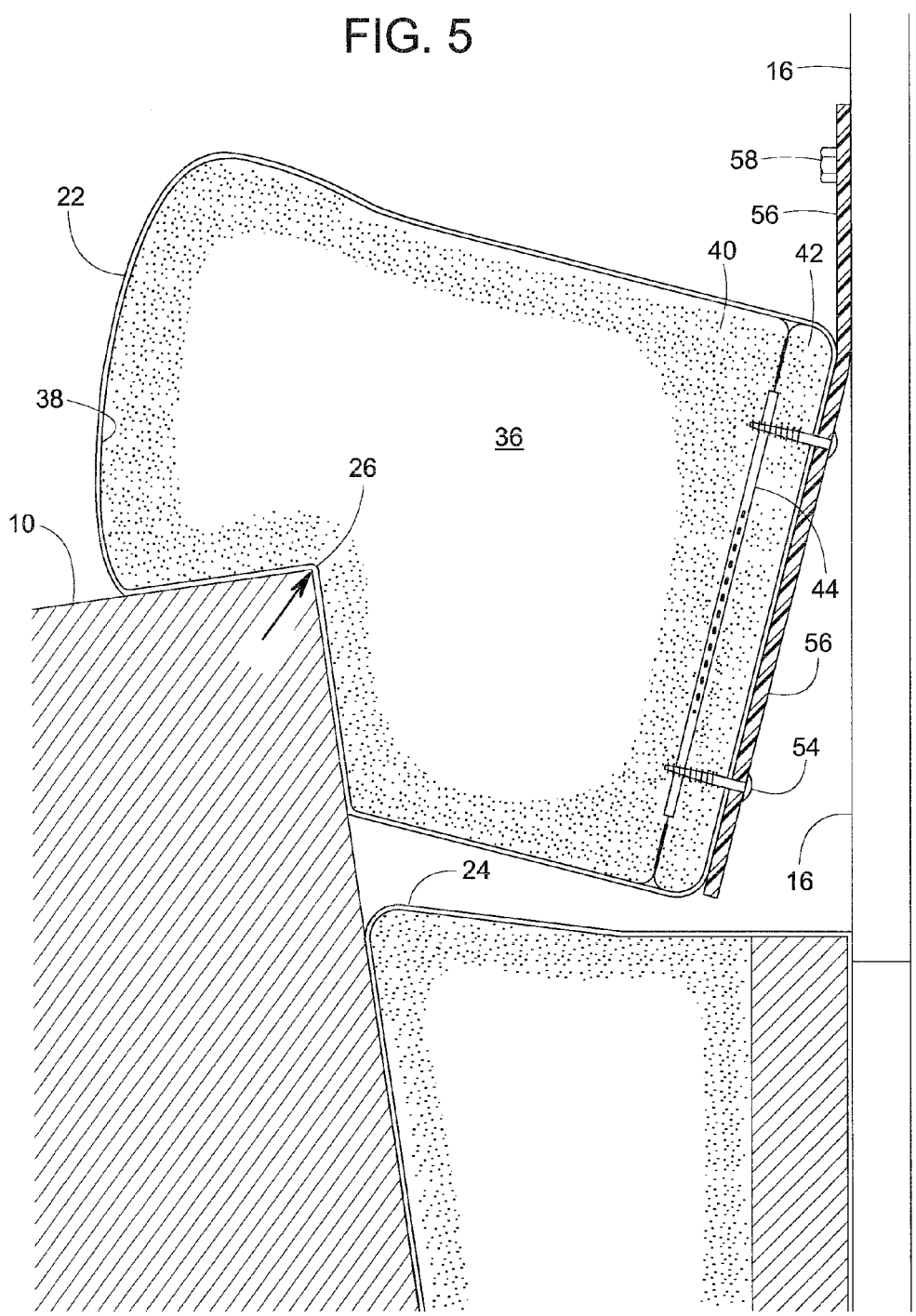
FIG. 5 is a cross-sectional end view similar to FIG. 4 but showing the upper rear edge of the vehicle prying the head seal upward.

With a yard jockey, a typical operating sequence would be: 1) a yard jockey lifting the front end of the trailer (thus lowering the trailer's rear edge); 2) the yard jockey forcing the trailer's upper rear edge deeply into the dock's head seal (FIG. 4); and 3) the yard jockey subsequently lowering the front end of the trailer down upon the trailer's landing gear. As the front end of the trailer descends, the trailer's upper rear edge pries the head seal upward (FIG. 5).

To prevent damaging seal 20 under such conditions, head seal 22, lateral seals 24, and/or lower seal 32 can be of a construction that tolerates extreme compression, translation, rotation and/or distortion. This can be accomplished by supporting dock seal 20 with something other than a conventional backer; which is usually relatively thick and consumes volume that could otherwise be used for resilient compression and distortion. If a conventional backer of standard thickness were used to support the compressible portion of the seal, there is less room available for compression. In some cases, the support member is fastened to wall 16 with structure that allows some relative movement between seal 20 and wall 16. Although an example will be described with reference to head seal 22, the same seal design may also apply to lateral seals 24 and perhaps lower seal 32.

Referring to FIGS. 3-6, head seal 22 comprises a compressible body 36, encased within a flexible protective cover 38. The term, "compressible body" refers to any structure than can resiliently return to its normally expanded shape after being compacted by an external force, such as the force exerted by vehicle 10. Examples of compressible body 36 include, but are not limited to, a foam block or a collapsible mechanism. In a current example, compressible body 36 comprises a front compressible body 40 and a rear compressible body 42. Alternatively, compressible body 36 may comprise only front compressible body 40 with rear compressible body 42 being omitted. Rear compressible body 42, however, can improve the sealing between head seal 22 and the face of wall 16. Rear compressible body 42 might also help in fastening a support panel 44 to front compressible body 40, wherein support panel 44 provides suitable structure for fastening head seal 20 to wall 16.

Figure 6:
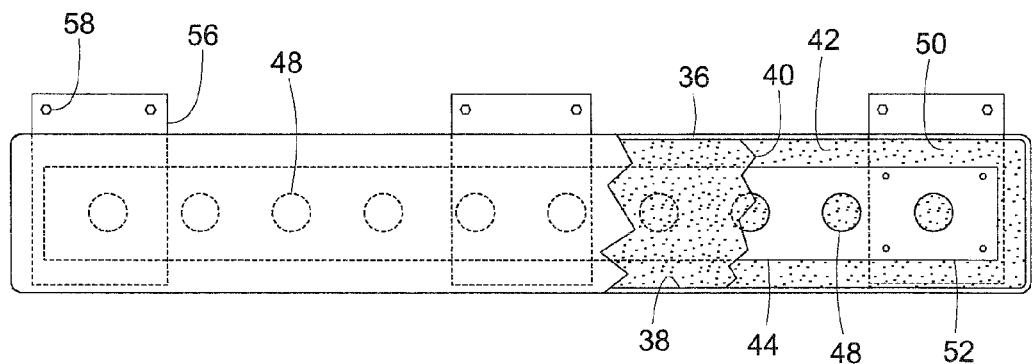
FIG. 6 is a front view of a head seal with portions cut away to reveal the seal's inner construction.

Although the actual design of head seal 22 may vary, in a current example, support panel 44 is sandwiched between compressible bodies 40 and 42. Referring to FIG. 6, adhesive 46 bonds bodies 40 and 42 together where the two bodies 40 and 42 come in contact with each other through a series of holes 48 in panel 44 and in an area 50 surrounding an outer perimeter 52 of support panel 44. Adhesive 46 may also provide some bonding directly between support panel 44 and the facing surfaces of compressible bodies 40 and 42.

Even though it is conceivable and well within the scope of the disclosure to bond or otherwise attach support panel 44 directly to compressible body 40 and omit compressible body 42, such a design does not work quite as well as having support panel 44 interposed between two bondable bodies. If compressible body 40 is not firmly attached to support panel 44 (due to body 42 being omitted, due to the support panel being too pliable, and/or due to panel 44 and body 40 being of different materials that are not readily bonded by a common adhesive), compressible body 40 might move relative to panel 44 and roll within cover 38. With the addition of compressible body 42, it has been found that bodies 40 and 42, being of a similar material, can be readily bonded to each other to firmly capture support panel 44.

In a current example, compressible bodies 40 and 42 are made of a class L24 open-cell polyurethane foam; however, other foams and compressible or collapsible structures are well within the scope of the disclosure. Cover 38 can be any appropriate material including, but not be limited to, HYPALON, canvas duck, rubber impregnated fabric and coated nylon fabric. Support panel 44 can be made of metal, plastic or some other material that is substantially thinner and denser than front compressible body 36.

To mount head seal 22 to wall 16, any suitable fastener 54 can be used to fasten support panel 44 directly to the face of wall 16 or used to fasten support panel 44 to one or more flexible panels 56, which in turn are mounted to wall 16 via another fastener 58. When vehicle 10 pries upward against seal 22, as shown in FIG. 5, flexible panel 56 allows seal 22 to pivot or move relative to wall 16. Flexible panel 56 can be made of any appropriately flexible material including, but not limited to, ⅛-inch HMW polyethylene.

To maximize the compressibility of head seal 22, support panel 44 is much thinner than front compressible body 40. When in the relaxed state of FIG. 3, front compressible body 40 has a forward surface 60 and a rear surface 62 that define a compressible projection 64 therebetween. Support panel 44 has a thickness or panel projection 66 defined by the distance between a forward-most point 68 and a rearward-most point 70 on panel 44. To provide head seal 22 with extreme compressibility, seal 22 should have a projection ratio of less than 2%, wherein the projection ratio is defined as panel projection 66 divided by compressible projection 64. Best results are achieved when the projection ratio is between 0.5% and 1.5%.

Also, head seal 22 may have a density ratio of less than 3%, wherein the density ratio is defined as density of front compressible body 40 divided by the material density of support panel 44. Even better results are achieved when the density ratio is less than 1%. For an optimum combination of the projection ratio and the density ratio, the density ratio is may be less than the projection ratio. For a current example, compressible projection 64 is about 8 to 23 inches, panel projection 66 is about ⅛ inch, front body 40 has a density of about 1.5 pounds per cubic foot (24 kg/m3), and support panel 44 has a material density of about 480 pounds per cubic foot when made of steel or about 58 pounds per cubic foot when made of HMW polyethylene.

Figure 7:
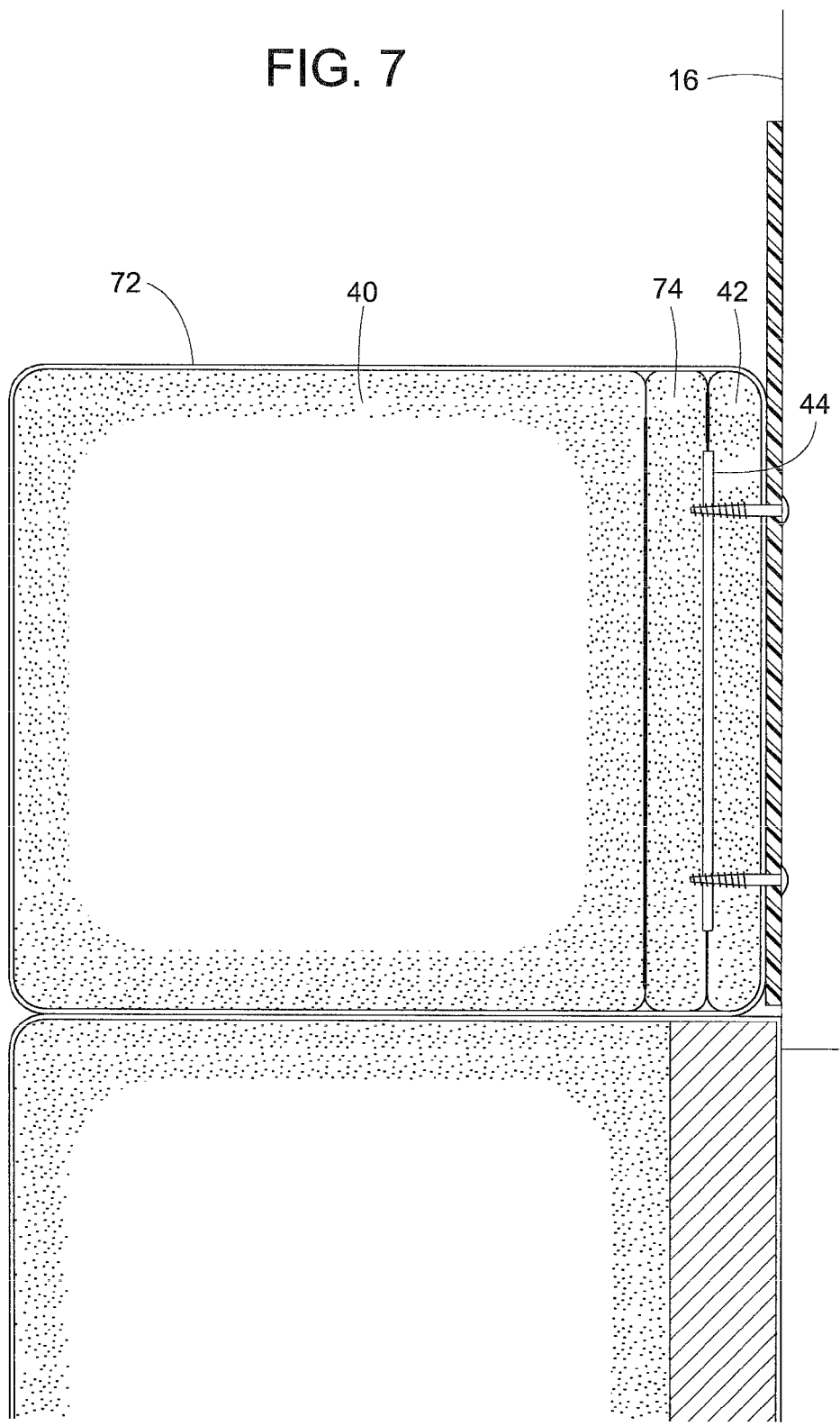
FIG. 7 is a cross-sectional end view similar to FIG. 3 but showing an alternate design.
Figure 10:
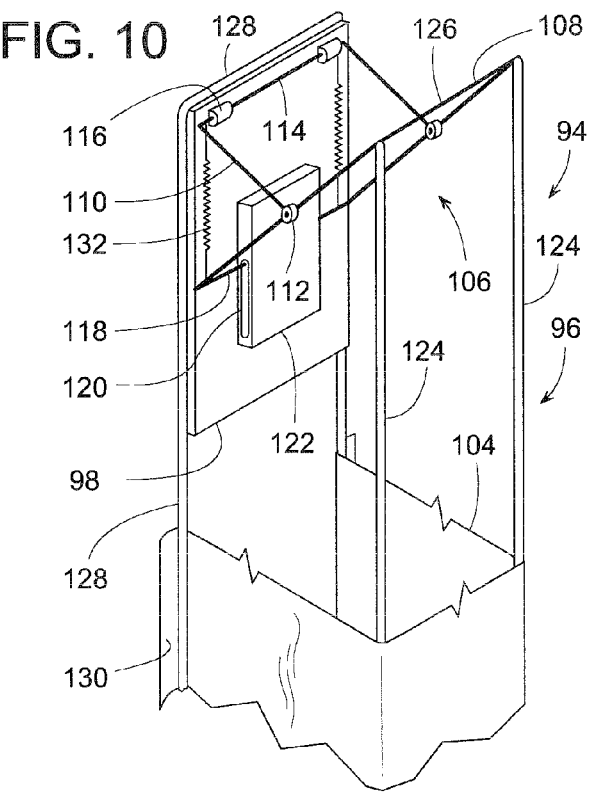
FIG. 10 is a perspective view of another dock seal with portions cut away to show its inner construction.
Figure 11:
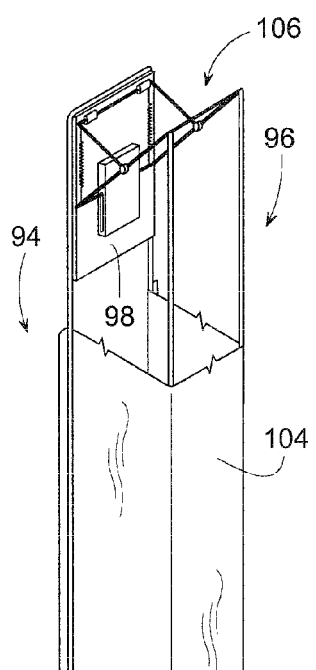
FIG. 11 is a perspective view similar to FIG. 10 but showing both ends of the seal.
Figure 12:
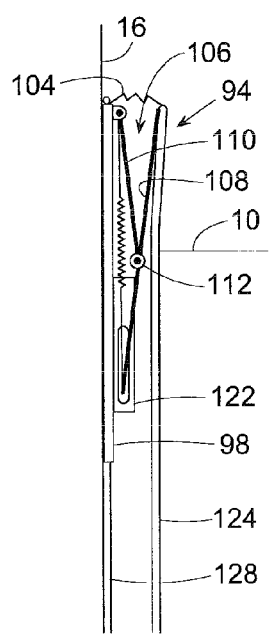
FIG. 12 is a cross-sectional side view of the dock seal of FIGS. 10 and 11 but showing the seal in a compressed state.
Figure 13:
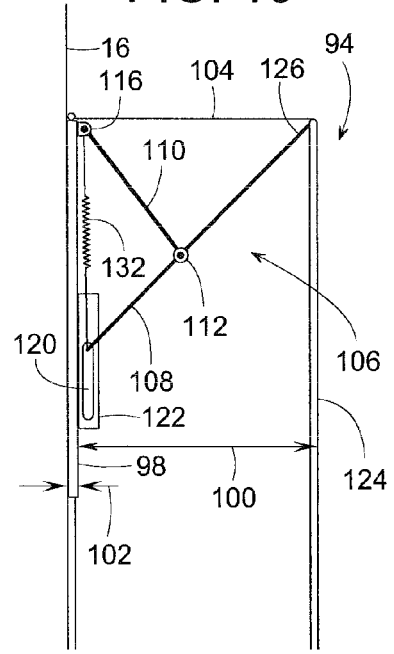
FIG. 13 is a cross-sectional view similar to FIG. 12 but showing the seal in its expanded state.

To facilitate manufacturability, a slightly modified head seal 72 can be made as shown in FIG. 7. In this case, seal 72 includes an intermediate compressible body 74 interposed between support panel 44 and front body 40. Compressible bodies 40, 42 and 74 can all be made of the same material or can be made of different materials. Adhesive 46 can bond bodies 40, 42 and 74 together. Once assembled, seal 72 functions basically the same as seal 22.

Figure 8:
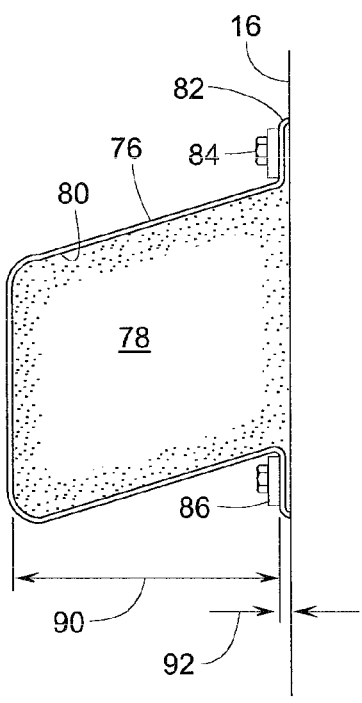
FIG. 8 is a cross-sectional end view similar to FIGS. 3 and 6 but showing another design.
Figure 9:
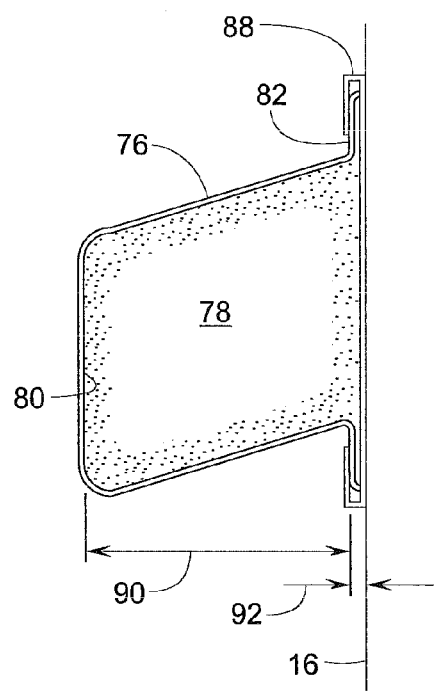
FIG. 9 is a cross-sectional end view similar to FIGS. 3, 6, and 7 but showing yet another design.

In other embodiments, shown in FIGS. 8 and 9, a head seal 76 comprises a resiliently compressible foam core 78 with an integral skin 80. Skin 80 is denser than core 78 so that skin 80 can provide seal 76 with a protective cover as well as serve as a support panel 82 in the form of flanges that lie generally parallel to wall 16. Support panel 82 can be used for mounting seal 76 to wall 16 via a conventional fastener 84 and a metal bar 86 (FIG. 8) or via a channel 88 that includes slots for receiving support panel 82 (FIG. 9). Bar 86 and channel 88 may extend fully or partially along the length of seal 76. Dimensions 90 and 92 represent the seal's compressible projection and panel projection, respectively. Seal 76 has the general shape of a parallelogram to make seal 76 more compliant in response to vertical motion of vehicle 10. This same shape can be applied to dock seal 20 as well.

FIGS. 10-13 illustrate a dock seal 94 (e.g., head seal, lateral seal or lower seal) that includes a hollow compressible body 96 connected to a support panel 98. Dimensions 100 and 102 (FIG. 13) represent the seal's compressible projection and panel projection, respectively. Compressible body 96 comprises a protective pliable cover 104 that is supported and held taut between two collapsible frame mechanisms 106.

In this particular example, each mechanism 106 includes a generally rectangular frame 108 (or some other suitable shape) with a generally U-shaped brace 110. The actual shapes of frame 108 and brace 110 may vary. Rotatable couplings 112 pivotally connect both legs of brace 110 to intermediate points on frame 108. A central section 114 of brace 110 can pivotally rotate within one or more anchors 116 that are fixed relative to wall 16. Frame 108 includes a section 118 that can both slide and pivot within a slot 120 defined by a track member 122. The pivotal connections at anchors 116 and couplings 112, and the combination pivotal/sliding connection at slot 120 allow frame 108 and brace 110 to move between the positions shown in FIGS. 12 and 13.

To help hold cover 104 taut, an elastic member 124 held in tension pulls an outer edge 126 of each frame 106 towards each other. Examples of elastic member 124 include, but are not limited to, a latex tube, a neoprene cord, helical spring, elastic strap, and the like. Elastic member 124 can be attached to frame 108 in any suitable manner. A similar elastic member 128 can be used for holding cover 104 to support panel 98, while a peripheral lip 130 on cover 104 can provide sealing between wall 16 and dock seal 94.

In some cases, elastic member 124 can be used for urging the dock seal to its expanded position. In other cases, however, where edge 126 moves in a generally linear motion between its positions of FIGS. 12 and 13 (i.e., moves in a direction that is substantially perpendicular to wall 16), an additional elastic member or tension spring 132 may be needed to urge dock seal 94 to its expanded position.

Even though various head seals and lateral seal have been shown as generally straight elongate members, it is well within the scope of the disclosure to provide similarly constructed dock seals of other shapes and designs. Instead of one long member, for instance, head seals 22 and 76 can be comprised of two or more shorter segments that are mounted end-to-end to create an elongate seal assembly of a desired length.

Figure 14:
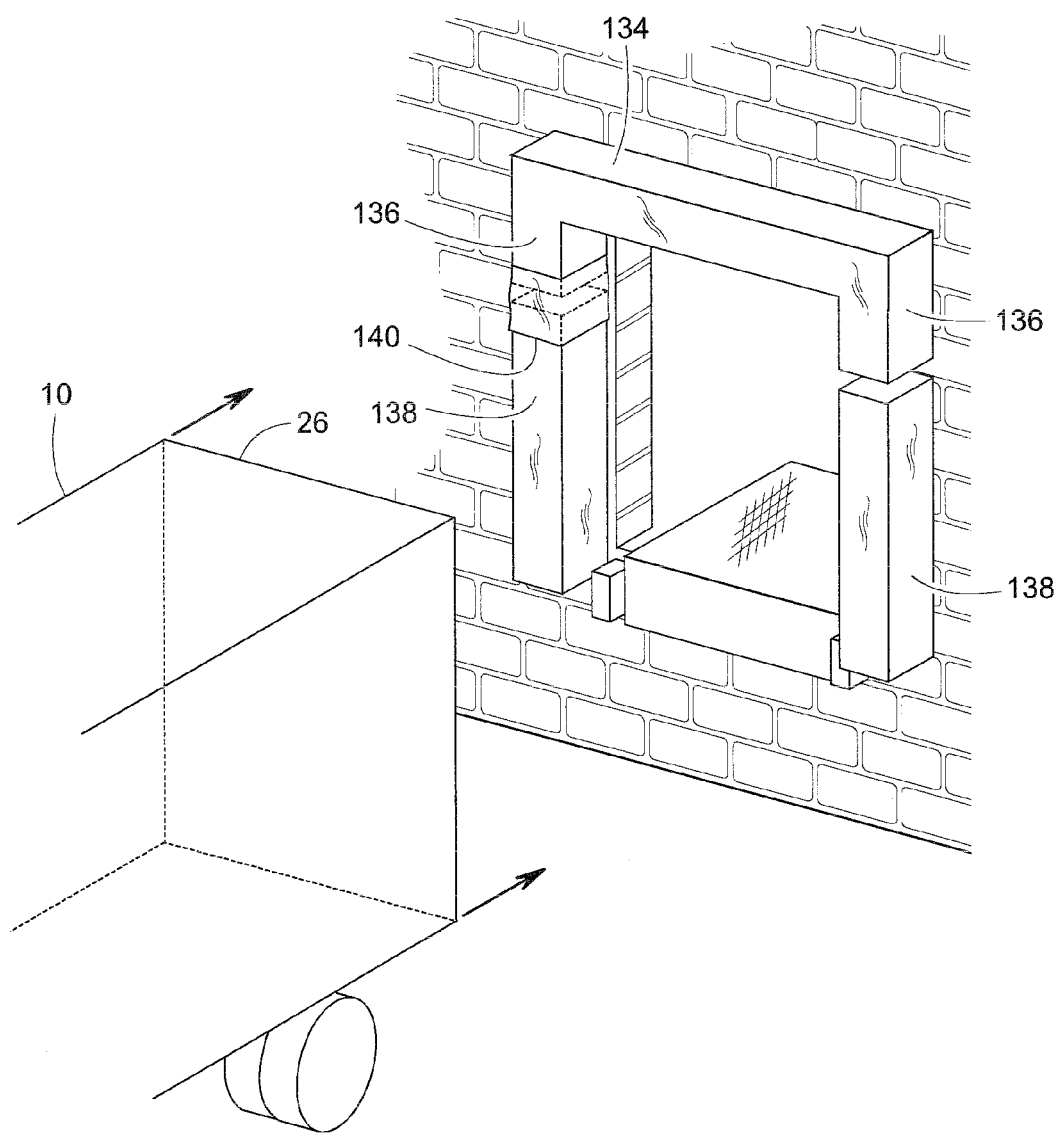
FIG. 14 is a perspective view similar to FIG. 1 but showing a dock seal with an alternate shape.

In other cases, as shown in FIG. 14, a head seal 134 includes lateral segments 136 that extend downward toward two lateral seals 138. In this example, the dock seal assembly does not include a bottom seal. A pliable cover 140 extending downward from segments 136 and overlapping lateral seals 138 can cover the gap between seals 134 and 138. Such a design helps prevent upper edge 26 of vehicle 10 from digging in between the upper end of a lateral seal and the lower adjoining surface of a generally straight head seal.

Figure 15:
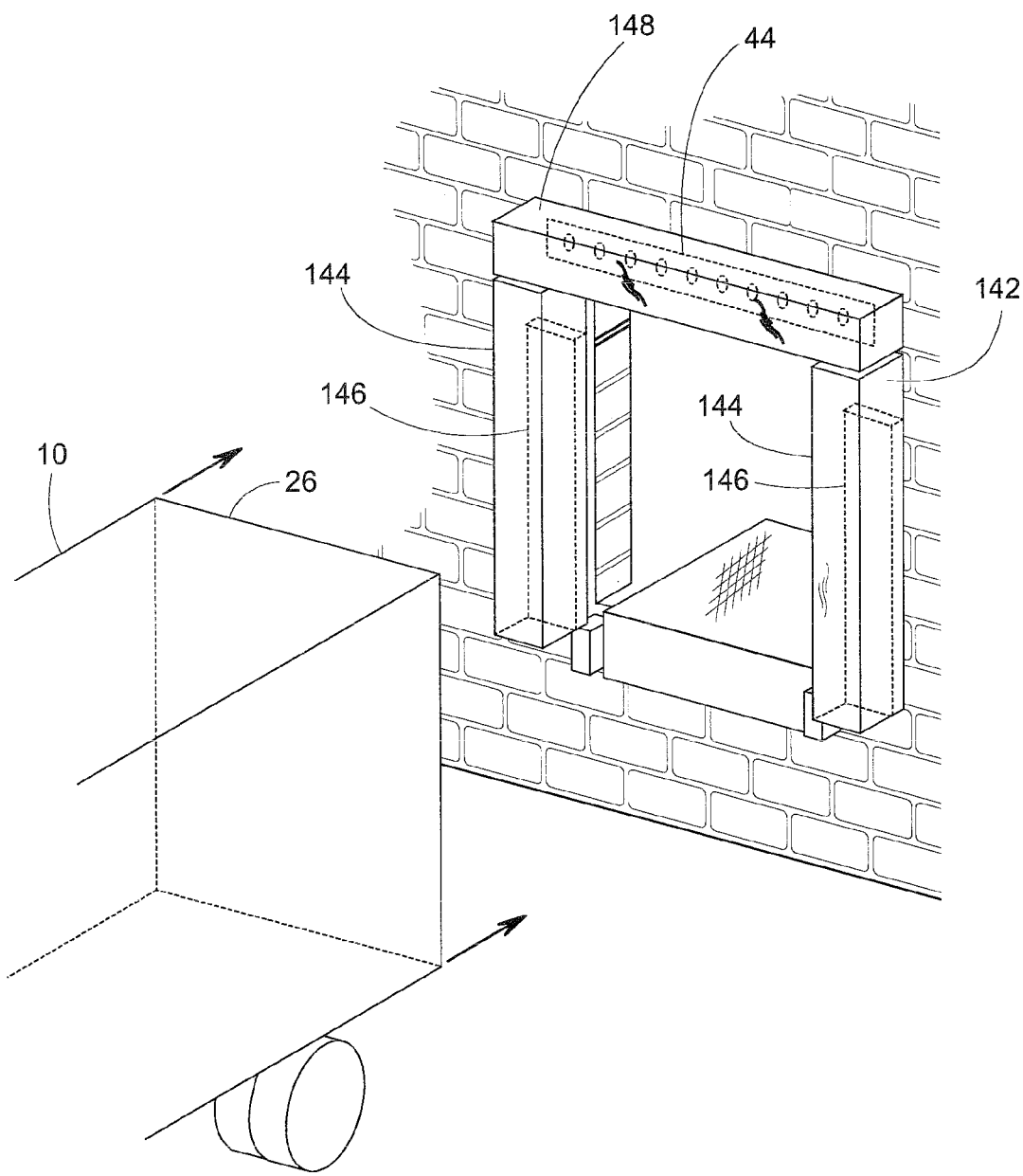
FIG. 15 is a perspective view similar to FIGS. 1 and 14 but showing an alternate embodiment.

As an alternative to the embodiment of FIG. 14, FIG. 15 shows a way of providing additional compressibility at an upper end 142 of a lateral seal 144. Although seal 144 includes a support panel 146 of standard thickness, panel 146 does not extend to the very top of seal 144. In this example, a head seal 148 can be of any design including, but not limited to, the designs of FIGS. 3, 7, 8 and 9.

Some of the aforementioned examples may include one or more features and/or benefits including, but not limited to, the following:

Some example dock seals comprise a compressible body reinforced by an ultra-thin support panel.

In some examples, a thickness of a support panel is less than approximately 2% of a compressible body's thickness.

In some examples, a thickness of a support panel is between about 0.5-1.5% of a compressible body's thickness.

In some examples, a support panel is a substantially flat piece rather than a formed sheet metal pan with flanges. As a flat piece, the support panel's material thickness is substantially equal to its panel projection, which maximizes the compressible projection of the dock seal.

In some examples, a flexible panel couples a dock seal and a support panel to a wall such that the flexible panel allows the seal and the support panel to move relative to the wall, wherein the movement is in a direction that is generally perpendicular to the seal's length.

In some examples, a support panel is embedded within a compressible body so that the support panel can be readily bonded in place.

In some examples, a dock seal includes a front compressible body for sealing against a vehicle and a rear compressible body for sealing against a building wall.

In some examples, the compressible body of a dock seal comprises a collapsible frame supporting a pliable cover.

In some examples, a support panel of a compressible body includes a series of holes that facilitates bonding the panel in place.

In some examples, a dock seal includes a front compressible body for sealing against a vehicle, a rear compressible body for sealing against a building wall, and an intermediate compressible body that helps in bonding a support panel and the rear compressible body to the front compressible body.

In some examples, the dock seal includes a compressible body and a support panel, wherein the relative densities and relative projections of the body and the panel are within a specific novel range such that the dock seal is particularly tolerant of deep gouging and prying by a vehicle pressing up against the seal.

Although the invention is described with respect to various examples, modifications thereto will be apparent to those of ordinary skill in the art. The scope of the invention, therefore, is to be determined by reference to the following claims:

What we claim is:

1. A dock seal mountable adjacent a doorway of a wall and being adapted to seal against a vehicle at a loading dock, the dock seal comprising:
   a compressible body having a front compressible body and a rear compressible body, the rear compressible body is interposed between the wall and the front compressible body when the dock seal is mounted to the wall; and
   a flexible panel to pivotally couple the compressible body to the wall, the flexible panel having a first portion to be attached to the wall adjacent an opening of the doorway and a second portion movable relative to the wall and the first portion when the first portion is attached to the wall, the first portion to remain engaged with the wall and the second portion to pivot away from the wall and relative to the first portion when the vehicle imparts a force to the compressible body, the second portion to pivot toward the wall and relative to the first portion when force imparted by the vehicle to the compressible body is removed.

2. A dock seal as defined in claim 1, further comprising a support panel interposed between the front compressible body and the rear compressible body, the support panel being denser than the front compressible body.

3. A dock seal as defined in claim 2, further comprising an intermediate compressible body, wherein the intermediate compressible body is interposed between the support panel and the front compressible body.

4. A dock seal as defined in claim 2, further comprising an adhesive bonding the compressible body to the support panel.

5. A dock seal as defined in claim 2, wherein the support panel includes a plurality of holes.

6. A dock seal as defined in claim 5, further comprising an adhesive disposed through at least one of the plurality of holes in the support panel to bond the front compressible body and the rear compressible body where the two bodies come in contact with each other.

7. A dock seal as defined in claim 2, wherein the support panel is made of plastic.

8. A dock seal as defined in claim 1, wherein the second portion is attached to the compressible body and the first portion couples the compressible body and the second portion to the wall.

9. A dock seal as defined in claim 8, wherein the second portion of the flexible panel encases at least a portion of the compressible body.

10. A dock seal as defined in claim 1, wherein the dock seal is horizontally elongate and lies above the doorway when the dock seal is mounted to the wall.

11. A dock seal as defined in claim 1, wherein the flexible member is attached directly to the wall.

12. A dock seal as defined in claim 1, wherein the entire rear compressible body is able to compress.

13. A dock seal as defined in claim 1, wherein the second portion of the flexible panel enables the compressible body to pivot away from the wall when the vehicle applies an upward force against the compressible body.

14. The dock seal as defined in claim 1, wherein the first portion of the flexible member remains against the wall when the second portion pivots relative to the first portion.

15. The dock seal as defined in claim 1, wherein the first and second portions of the flexible panel are substantially parallel relative to the wall when the flexible panel is coupled to the wall and the vehicle is not engaged with the compressible body.

16. The dock seal as defined in claim 1, wherein the second portion of the flexible member is in line with the wall when the flexible member is mounted to the wall and free from a force imparted by the vehicle.

17. The dock seal as defined in claim 1, further comprising a support panel positioned between the compressible bodies, the flexible panel to couple the dock seal to the wall so that the compressible body and the support panel are able to pivot relative to the wall when the dock seal is attached to the wall via the flexible panel.

18. A dock seal mountable adjacent a doorway of a wall and being adapted to seal against a vehicle at a loading dock, the dock seal comprising:
a compressible body having a front compressible body and a rear compressible body, the rear compressible body is interposed between the wall and the front compressible body when the dock seal is mounted to the wall;
a flexible panel to pivotally couple the compressible body to the wall;
a support panel interposed between the front compressible body and the rear compressible body, the support panel being denser than the front compressible body; and
an adhesive bonding the front compressible body to the rear compressible body where the two bodies come in contact with each other in the area surrounding the perimeter of the support panel to capture the support panel between the front compressible body and the rear compressible body.

19. A dock seal mountable relative to a wall above a doorway and being adapted to seal against a vehicle at a loading dock, the dock seal comprising:
a compressible body that is horizontally elongate when the dock seal is mounted to the wall above the doorway; and
a flexible panel attached to the compressible body and mountable substantially parallel to the wall to position the compressible body adjacent an opening of the doorway, the flexible panel to flex at a location along a length of the flexible member to enable the compressible body to pivot away from the wall while at least a portion of the flexible member remains substantially parallel relative the wall when the vehicle engages the compressible body.

20. A dock seal as defined in claim 19, further comprising a support panel coupled to the compressible body when the dock seal is mounted relative to the wall, the support panel being stiffer than the compressible body.

21. A dock seal as defined in claim 20, wherein the support panel is attached to the flexible panel.

22. A dock seal as defined in claim 20, further comprising a rear compressible body, wherein the rear compressible body is interposed between the support panel and the flexible panel.

23. A dock seal of claim 19, wherein the compressible body is to pivot away from the wall when the vehicle applies an upward force to the compressible body.

24. A dock seal mountable relative to a wall above a doorway and being adapted to seal against a vehicle at a loading dock, the dock seal comprising:
a compressible body mountable relative to the wall above the doorway; and
a flexible panel to mount the compressible body directly to the wall, the flexible panel having a first portion to be coupled to the wall and and a second portion attached to the compressible body, the first and second portions being substantially in line with the wall when the flexible panel is coupled to the wall and the compressible body is not engaged by the vehicle, the second portion of the flexible panel to pivot to a non-parallel position relative to the wall to enable the compressible body to pivot away from the wall while the first portion is to remain substantially in line with the wall when the vehicle applies an upward force against the dock seal.

25. A dock seal as defined in claim 24, further comprising a support panel coupled to the compressible body, wherein the flexible panel enables the support panel to pivot relative to the wall.

26. A dock seal as defined in claim 24, wherein the compressible body is substantially horizontal when the dock seal is mounted relative to the wall.

27. A dock seal as defined in claim 24, further comprising a cover to at least partially enclose the compressible body, wherein the first portion of the flexible member is coupled to the cover.

28. A dock seal as defined in claim 24, wherein the second portion of the flexible panel is to be coupled to the wall at a position above an upper surface of the compressible body.

29. A dock seal as defined in claim 28, wherein the second portion of the flexible panel is coupled to the wall via a fastener.

30. A dock seal as defined in claim 29, further comprising a gap between the upper surface of the compressible body and the fastener.

* * * * *